United States Patent [19]
Harada et al.

[11] Patent Number: 4,586,721
[45] Date of Patent: May 6, 1986

[54] CONVERTIBLE STROLLER

[76] Inventors: Steve N. Harada; Kathleen L. Harada, both of P.O. Box 798, Coupeville, Wash. 98239

[21] Appl. No.: 684,839
[22] PCT Filed: Dec. 7, 1984
[86] PCT No.: PCT/US84/02026
  § 371 Date: Dec. 7, 1984
  § 102(e) Date: Dec. 7, 1984

Related U.S. Application Data

[63] Continuation-in-part of Ser. No. 429,253, Sep. 30, 1982, Pat. No. 4,487,428.

[51] Int. Cl.⁴ .............................................. B62B 7/12
[52] U.S. Cl. ..................................... 280/30; 280/648
[58] Field of Search ............. 280/30, 644, 642, 648, 280/649, 47.25, 47.28; 248/166, 188.6; 297/130

[56] References Cited

U.S. PATENT DOCUMENTS

| | | | |
|---|---|---|---|
| 1,718,962 | 7/1929 | Kimball | 280/47.26 X |
| 2,616,719 | 11/1952 | Heideman | 280/649 X |
| 2,670,216 | 2/1954 | Leonard | 280/641 |
| 3,212,788 | 10/1965 | Adler | 280/639 |
| 3,222,081 | 12/1965 | Harmon, Jr. | 280/649 X |
| 3,431,020 | 3/1969 | Tyndall | 297/378 |
| 3,655,212 | 4/1972 | Krass et al. | 280/47.28 X |
| 3,984,115 | 10/1976 | Miller | 280/30 |
| 4,157,837 | 6/1979 | Kao | 280/30 |
| 4,362,307 | 12/1982 | Nakatani | 280/30 |
| 4,376,547 | 3/1983 | Dominko | 280/30 |
| 4,487,428 | 12/1984 | Harada et al. | 280/648 |

FOREIGN PATENT DOCUMENTS

| | | | |
|---|---|---|---|
| 2239876 | 2/1975 | France . | |
| 84948 | 1/1955 | Norway | 280/644 |

Primary Examiner—Joseph F. Peters, Jr.
Assistant Examiner—Michael Mar
Attorney, Agent, or Firm—Jensen & Puntigam

[57] ABSTRACT

A stroller including the known and accepted structure of wheels (6,10), handle (4) and a rigid frame (2, 8, 12, 14, 20, 22, 26) which supports a baby containing seat (34), enhanced by the fact that several selected ones of the individual elements (12, 14, 20, 22) comprising the frame which are rigid when in use, are selectively articulated and folded back on themselves or have their ends slideably (162,180) engaged to allow movement of the end of one member (160,176) along the length of the other member (172,150) allowing movement to a substantially parallel configuration, lessening the exterior dimension and permitting the stroller to be used as a back and shoulder supported carrying device, and further capable of being totally collapsed to a relatively flat non-bulky condition for storage.

6 Claims, 16 Drawing Figures

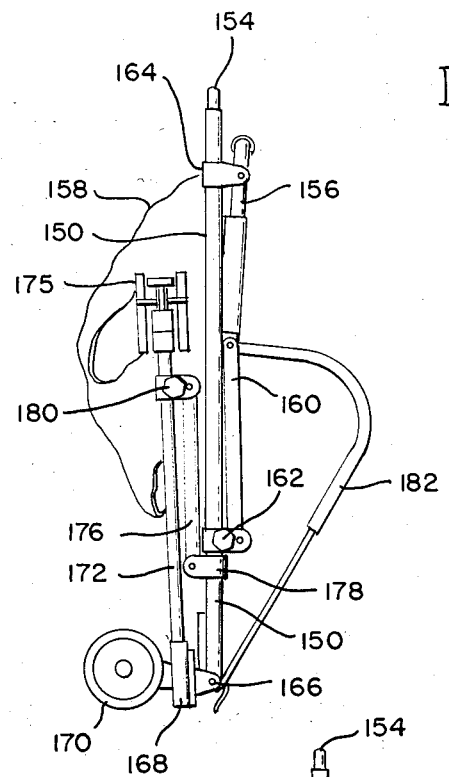
FIG. 13
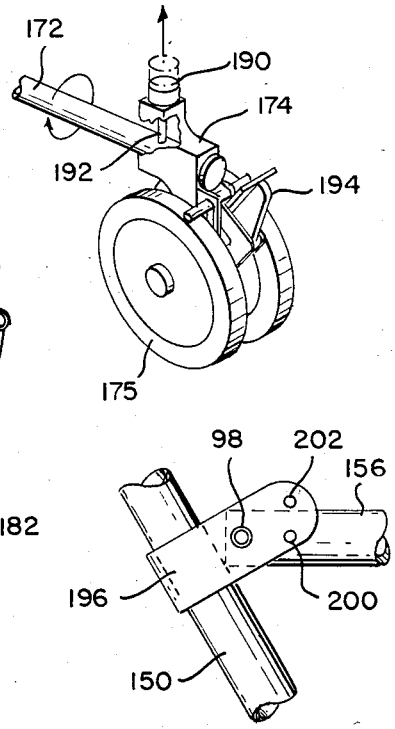
FIG. 14
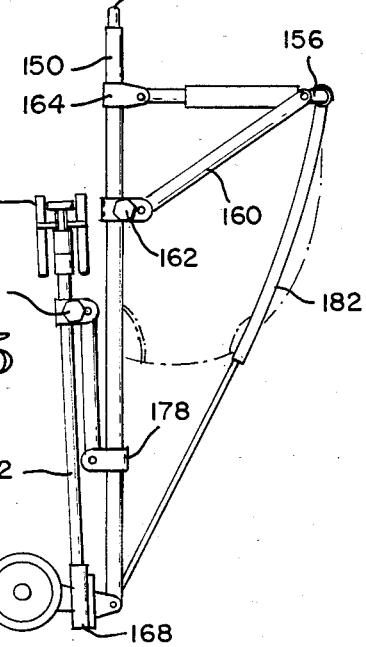
FIG. 15
FIG. 16

CONVERTIBLE STROLLER

This application is a continuation-in-part application based upon U.S. patent application Ser. No. 429,253 filed Sept. 30, 1982, now U.S. Pat. No. 4,487,428.

DESCRIPTION

1. Technical Field

This invention relates to strollers and more particularly to a stroller which because of the unique interrelationship of its frame elements is convertible to a backpack type carrying device.

2. Background Art

Strollers, perambulators and other devices for transporting children with less physical strain for the parents and greater comfort for the child are well known.

Traditionally, strollers have necessarily been rigid and somewhat bulky so that in use they would provide proper support for the child and keep the risk of injury to the child to a minimum. As a contra to the requirement for rigidity, since space has become a premium, it is extremely desirable that the strollers be collapsible such that they may easily be stored or transported when not in use.

The desirability and convenience of transporting children on the back of an adult is likewise well known and in the past, devices have been manufactured which essentially convert a backpack frame to a child carrier through the utilization of modified support and enclosing structure. These backpack/carrying devices are necessarily limited in that they are not easily converted for other carrying purposes and in general do not collapse. It is therefore not convenient to store the devices when it is no longer necessary to carry the child on the back.

Prior art known to the applicant include U.S. Pat. No. 3,984,115 granted to Miller which discloses a four wheeled stroller wherein the wheel supporting legs are selectively collapsible upwardly transforming the stroller into a rigid backpack child carrying device.

U.S. Pat. No. 4,157,837 granted to Kao on June 12, 1979 discloses a two-wheeled stroller having a rigid child enclosing framework wherein the handle may be collapsed downwardly allowing the device to be utilized as a backpack type carrier.

U.S. Pat. No. 956,399 granted to Morris on Apr. 26, 1910 discloses a collapsible tray and rack support wherein the elements are articulated so that the device may be collapsed.

U.S. Pat. No. 1,718,962 granted to Kimball on July 2, 1929 discloses a parcel or a luggage carrier which includes a main frame member capable of articulation at about midpoint as well as two horizontally extending bracket members held in position by articulated collapsible support elements such that the entire device may be collapsed for storage and the like.

U.S. Pat. No. 4,111,454 granted to Kassai on Sept. 5, 1978 discloses a folding baby carriage including intricate interconnecting members which are slideably interconnected or articulatable so that the device may be collapsed.

U.S. Pat. No. 4,256,325 granted to Fleischer on Mar. 17, 1981 discloses a collapsible frame for a baby carrier wherein the rear wheels supporting element and the baby supporting platform collapse towards the main frame when the handle member is collapsed.

U.S. Pat. No. D160,598 granted to Heideman on Oct. 25, 1950 discloses a collapsible baby stroller wherein the rear portion of the seat element is held in position by flexible straps allowing the device to collapse.

Norweigan Pat. No. 84948 granted Jan. 31, 1955 discloses another method of collapsing a baby stroller.

DISCLOSURE OF INVENTION

With the above noted prior art and the limitations thereof in mind, it is an object of the present invention to provide a device which is rigid and safe to use as a stroller but which likewise may be easily partially collapsed and used as a backpack type carrier and further, totally collapsed to a convenient compact size for storage.

It is another object of the present invention to provide a stroller with a unitary rigid main frame member and auxiliary frame members pivotally secured thereto such that the entire device may be collapsed for transport and convenient storage.

It is yet another object of the present invention to provide a lightweight collapsible stroller which includes all of the features necesary for the safety and comfort of the child.

Still a further object of the present invention is to provide a stroller including selectively articulated support frame member permitting the stroller to be partially or totally collapsed.

Yet another object of the present invention is to provide a stroller which is convertible to a backpack type carrier, fully collapsible for storage and yet simple of construction and light of weight.

It is an additional object of the present invention to provide an interconnection between frame members such that their relative position is infinitely adjustable within the limits of their length.

BRIEF DESCRIPTION OF THE DRAWINGS

FIG. 13 is a side elevational view of the stroller of FIG. 10 in its totally collapsed condition.

FIG. 14 is an enlarged view of the rear caster and its interconnection with the stroller.

FIG. 15 is a side elevational view of the stroller of FIG. 10 in the backpack position.

FIG. 16 is an alternate embodiment of the interconnection between the main frame and one of the collapsible frame members.

BEST MODE FOR CARRYING OUT THE INVENTION

Figure 1:
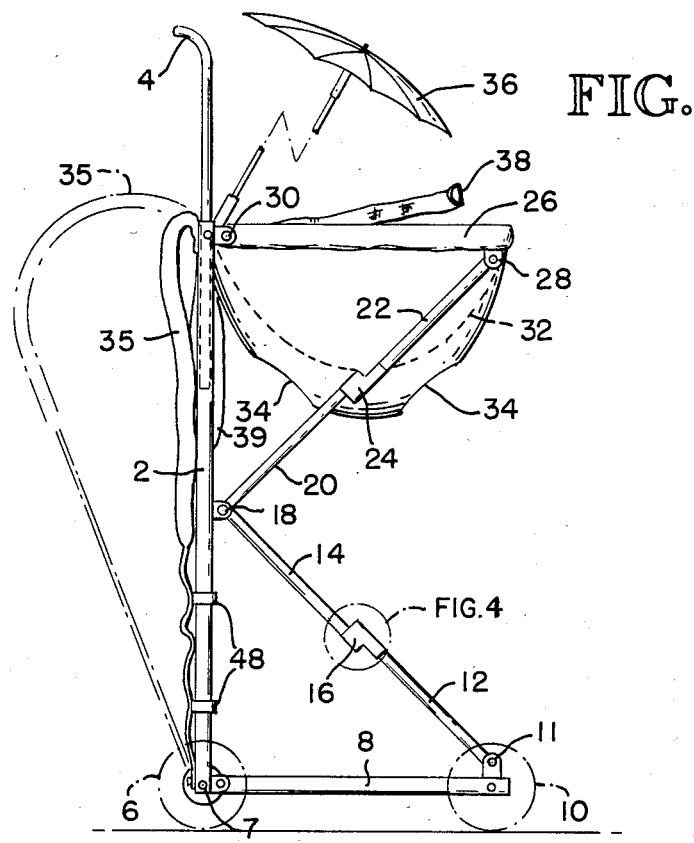
FIG. 1 is a side elevation of one embodiment of the present invention illustrating the structure which enables the stroller to be selectively collapsed.

Referring now to FIG. 1, the inventive convertible, collapsible backpack stroller combination in one embodiment is seen as including a rigid substantially vertical, upright adjustable telescoping member 2 which includes a handle member 4, at its upper end and a standard set of wheels be they singular or dual 6 at its lower end. Immediately adjacent the lower end of the rigid element 2 is a pair of selectively articulated forwardly extending arms 8 having secured to the outer end thereof, wheels 10 which are identical to the wheel 6 at the bottom of the main frame member 2. It is to be understood that the sets of wheels may be pivotally attached and may include brakes. A collapsible linking member, having sections 12 and 14 joined by a locking hinge member 16, is pivotally connected to the main frame member 2 at a point 18 intermediate the ends of the frame member. The particular location of the hinge/joints 7, 11, 16 and 18 allow the arm comprising elements 12 and 14 to be collapsed against the frame member 2 and the forwardly extending arms 8 to rotate upwardly to a position adjacent the frame 2. In this condition, as will be explained hereinafter, the lower collapsible frame is secured in position and the backpack carrier is now in the proper configuration for being used as a backpack carrier.

At a hinge point 18, which need not be identical with the previously described hinge point, a second diagonal arm comprising elements 20, 22 joined by locking hinge member 24 extends diagonally upwardly to support rearwardly extending horizontal frame member 26 which is pivotally connected to frame element 22 at 28 and to frame member 2 at 30 such that this structure may likewise be collapsed against the main frame member 2. The articulated support comprising elements 20, 22 and horizontal rectangular frame member 26 serve as a support (see FIG. 3) for a baby carrier sling or seat device 32 having openings 34 fore and aft such that the baby may be placed facing forwardly or rearwardly. It is to be understood that the seat is adjustable, see phantom lines, and removable and further, that the frame member 26 is preferably convered with a removable pad.

Also as seen in this view, there is provided a pair of padded shoulder straps 35 shown in the collapsed condition against the carrier and also, in phantom, in the extended or usable condition. As will be explained hereinafter, a padded back contacting member is provided for stability and for comfort of the person carrying the device.

Further to be seen in this view is included a detachable, umbrella like shade device 36 and an additional securing strap or seat belt 38. A pouch 39, which may be removable is provided to accommodate paraphernalia necessary when one has a child.

Figure 2:
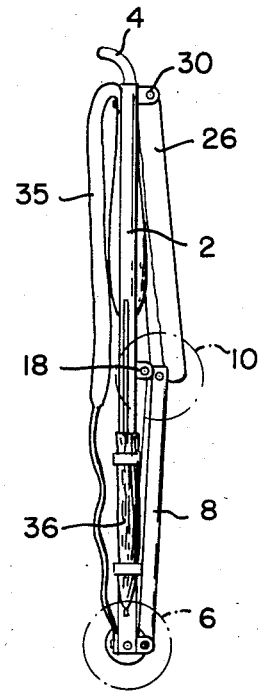
FIG. 2 is the stroller of FIG. 1 in the collapsed storing condition.

Referring now to FIG. 2, the stroller can be seen in its collapsed position with the umbrella 36 removed and stored adjacent the rigid main frame member 2. As seen in this view, the front wheels 10 have been pivoted upwardly to a position adjacent the frame member 2, the upper frame member 26 has been pivoted downwardly adjacent the frame member 2 and the handle telescoped and the entire device occupies very little volume and may be easily stored or carried in the trunk of a vehicle.

Figure 3:
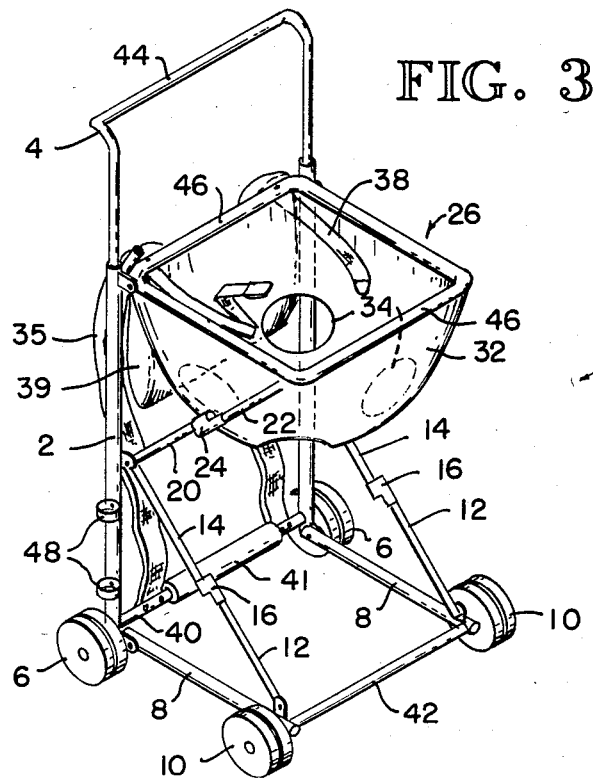
FIG. 3 is an isometric representation of the stroller of FIG. 1.

Referring now to FIG. 3, the interrelationship of the various parts may be more readily seen. Further to be seen are the rigid connector or axles members 40, 42 as well as the interconnecting handle 44 and the lateral portions 46 of the frame member 26. Rear axle 40 is padded as at 41 as explained hereinabove.

Further to be seen in this view are a pair of loops 48 secured to the lower portion of frame member 2 to support the umbrella-type sun shade when in the collapsed condition.

Figure 4:
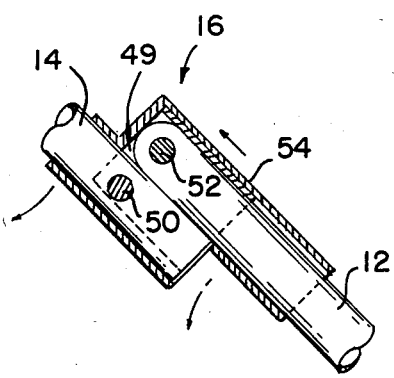
FIG. 4 is an enlarged sectional view of the interconnection of FIG. 1 disclosing the structure which allows the braces to be selectively articulated.

The enlarged view, FIG. 4, discloses a locking joint element show, for illustrative purposes, on interconnected rigid frame members 12 and 14. The joint element includes a separate surrounding sleeve member 16 supporting the hinge pins 50, 52 such that the members 14 and 12 can move relative to each other. The outermost portion of surrounding member 49 is open adjacent one of the two elements such that the element can pivot away from the other element to collapse and yet is firmly held in place and reinforced in the extended position. For security, a sliding, overlying sleeve 54 is utilized to further assure that the elements will not collapse from their extended position. Sleeve 54 is moved upwardly on the adjacent member to permit articulation and slide downwardly over the joint to prevent accidental collapse.

Figure 5:
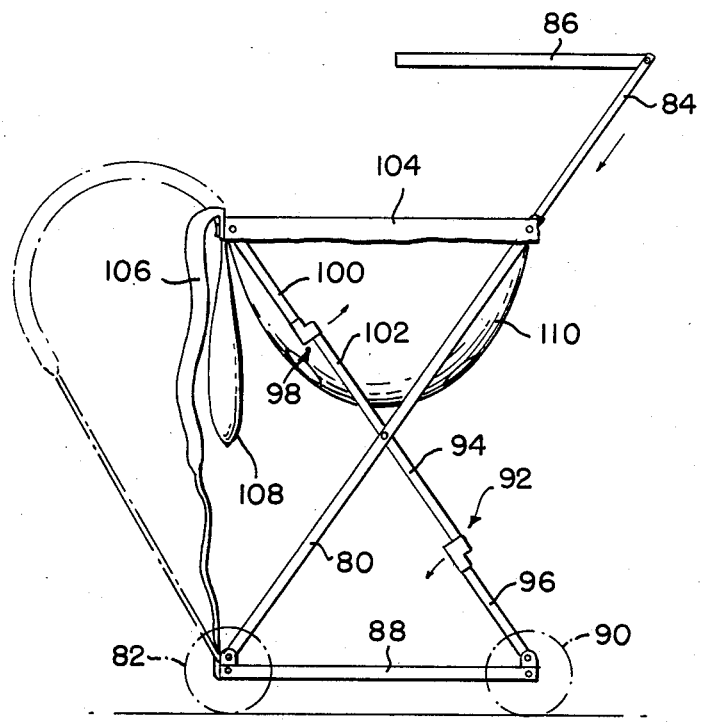
FIG. 5 is a side elevation view of an alternate stroller embodiment.

Referring now to FIG. 5, another embodiment is shown which discloses the rigid main frame member 80 extending at a diagonal to the horizontal and from the set of forward wheels 82 to a rearward adjustable telescoping handle 84 which has removably or pivotally secured thereto a sun shade 86. Similarly but not identical to the previously described embodiment, the rigid spacing member 88 causing separation between the sets of wheels 82 and 90 is pivotally secured to the lower end of rigid member 80 and the ability of support member 92 comprising elements 94 and 96 to articulate allows the wheels 90 to pivot upwardly out of the way when the device is being used as a backpack carrier. A means for securing the wheels in an upward position will be provided.

Figure 6:
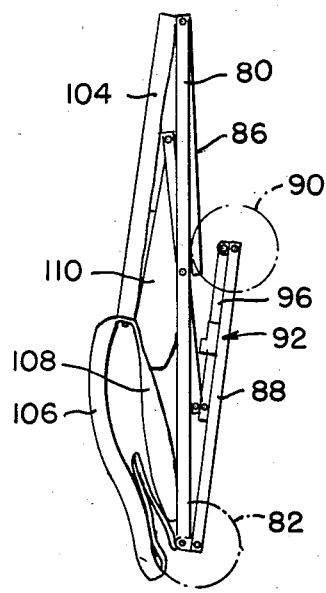
FIG. 6 is a side elevation view of the stroller of FIG. 5 in the collapsed condition.

For total collapse of the stroller, the articulated member 98 consisting of the elements 100, 102 articulates allowing the rigid frame member 104 supporting the baby carrier to collapse downwardly against the frame member resulting in a collapsed unit as shown in FIG. 6. It is to be noted that this model likewise includes a set of padded shoulder straps 106 for utilization when being used as a backpack device, a bag 108 for carrying additional items and a baby support sling or carrier seat 110 and further, the wheels may be double and capable of swiveling can include brakes. The sun shade may be moved upwardly and downwardly with the telescoping adjustable upper handle portion 84 of the rigid member 80. Shade 86 may be removable or pivotable about handle 84 to a collapsed condition.

Figure 7:
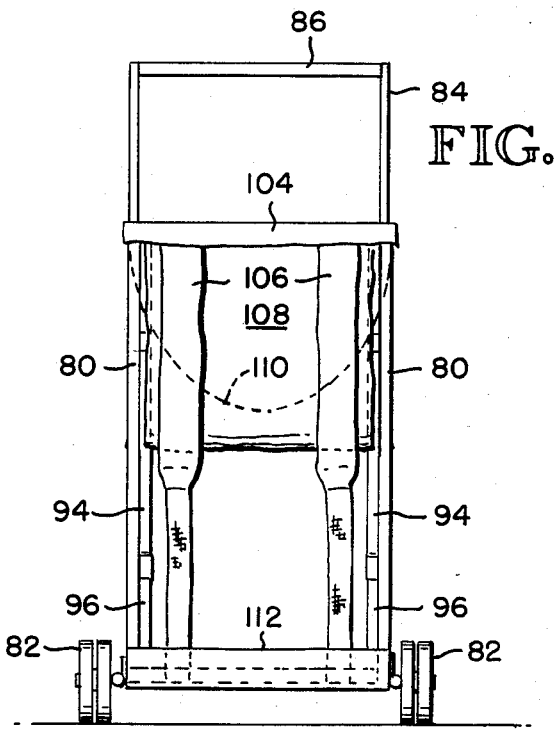
FIG. 7 is a rear elevation view of a stroller of FIG. 5.

Referring now to FIG. 7, as shown in this rear elevation view, a padded support element 112 is added rearwardly of the rear axle to provide a stabilizing member against the back of the person carrying the device when the device is used as a backpack carrier. It is to be understood that although not a part of the present invention, various paddings may be added when necessary to enable the device to be efficiently utilized.

Figure 8:
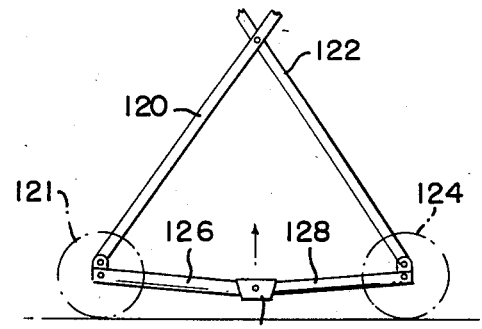
FIG. 8 is a partial view of an alternative structure enabling the stroller to assume the collapsed position.

Referring now to FIG. 8, a bottom portion of the third embodiment of the present invention is shown wherein the rigid main support 120 extends from the front wheel 121 to form the basis for a telescoping and adjustable handle. The lower rear support 122 as opposed to being articulated as described above is a single member pivotally secured to 120 at the lower end of which is secured a set of wheels 124. The spacing and rigidifying member joining wheel sets 121 and 124 is articulated enabling collapse.

Figure 9:
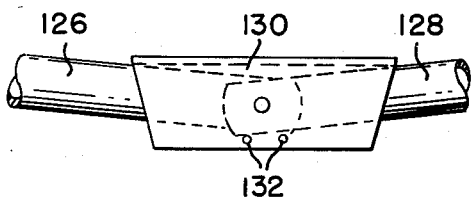
FIG. 9 is an enlarged view of the over-center hinge mechanism of FIG. 8.

The particular hinge preferred for this structure comprises elements 126 and 128 joined by an overcenter locking member 130 as best seen in FIG. 9. As seen in FIG. 9, elements 126 and 128 pivot within the central locking sleeve member 30 which is open at the bottom such that the members can be lifted upwardly to collapse but when moved to a downwardmost position, they abut pins 132 and the upper limits of the inverted U-shaped collar member 130.

Figure 10:
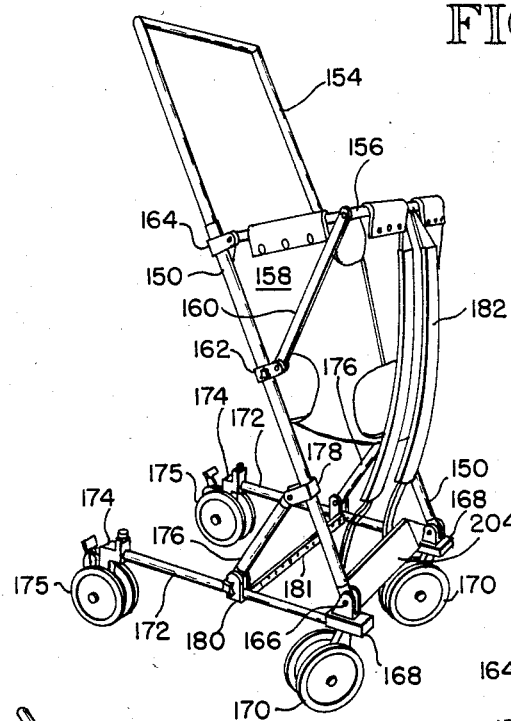
FIG. 10 is an isometric view of another embodiment of the present invention.
Figure 11:
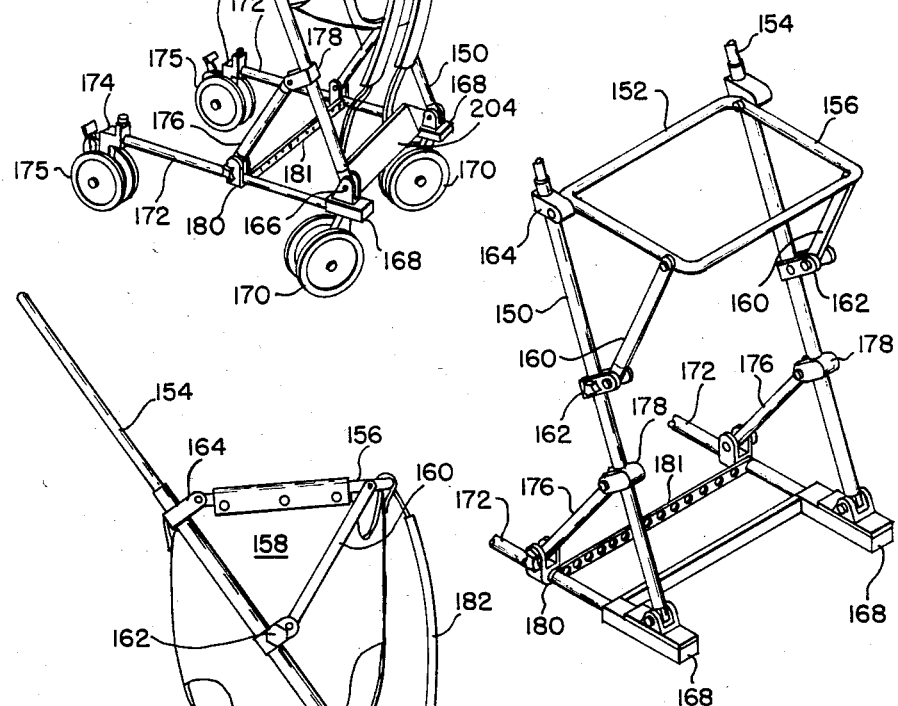
FIG. 11 is a view of the stroller of FIG. 10 from another point of view with the seat and straps removed.

As seen in FIG. 10, another embodiment is disclosed which includes a pair of main frame elements 150 which are substantially parallel and interconnected by a horizontal member 152 (see FIG. 11) at the upper end and capture and support a U-shaped downwardly facing handle member 154 which is telescopically received within the interior of members 150. Pivotably secured to frame members 150 is U-shaped seat supporting member 156 which supports seat 158 and is held in its expanded position by support members 160. The frame portion which supports the seat can alternatively be unitary and could obviously be rounded rather than rectangular. Support members 160 are pivotally secured to U-shaped member 156 at their upper end and slidably secured to frame member 150 at the lower end by means of combination slide and securement means 162. The rectangular upper support member 156 is secured to main frame members 150 by means of hinge members 164.

Referring now to the lower end of the stroller main frame members 150 are hingedly connected by hinge elements 166 to rigid block member 168 which provides a mounting point for wheels 170 which are pivotable about a vertical axis. Linking member 169 extending between block members 168, see FIG. 11, serves to rigidify the lower end of the frame. Extending rearwardly from blocks 168 are horizontal frame members 172 which terminate in elements 174 which as described hereinafter include brake means and are pivotable about two axes normal to each other. Angular support members 176 are hingedly secured to frame members 150 at 178 and adjustably secured to horizontal frame members 172 by element 180 which can be secured as desired along 172. Horizontal parallel members 172 are held in appropriate spaced relationship by reinforcing member 181 which spans the distance therebetween.

Figure 12:
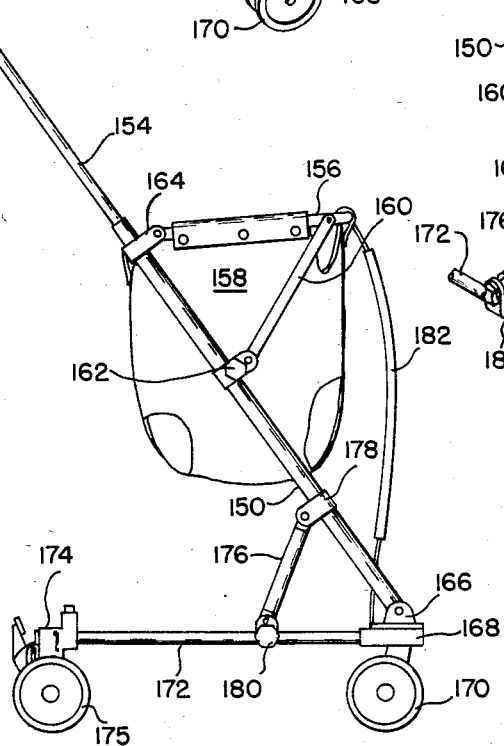
FIG. 12 is a side elevational view of the stroller of FIG. 10.

Further to be seen in FIGS. 10 and 12 are shoulder strap means 182 for carrying the device including a baby in pouch 158 when the device is in its semi-collapsed position as seen and described with respect to FIG. 15.

Referring now to FIG. 13 which discloses the inventive stroller in its fully collapsed position, it can be seen that wheels 175 have been pivoted so that they are located close to main frame member 150. Locking securement 180 has been moved along member 172 and secured in position with element 176 and 172 substantially parallel to each other as well as substantially parallel to element 150. Locking securement member 162 has been moved along element 150 to the point where element 156 and its support 160 are in an over-center locked position adjacent to 150. For convenience, the collapsed members may each include the overcenter latch possibilities. As can be seen in this view, the entire stroller is compact for storage or transport. In this condition, the stroller may be pulled by the handles, rolling on the front wheels 170.

Reference is now had to FIG. 14 wherein it can be seen that knob 190 mounted to the upper portion of element 174 is pulled upwardly releasing pin 192 from member 172 and then the entire wheel structure can be rotated through 90 degrees and the pin can be inserted into member 172 locking it in this position. Number 194 designates a brake element which frictionally locks the wheels in place for safety. Either or both sets of wheels may be equipped in this fashion.

Referring now to FIG. 15, the stroller is shown with the wheels of the unit collapsed as described with respect to FIG. 13 but with the upper carrier defined by U-shaped frame element 156 hinge element 164 and brace element 160 held in position by locking element 162. When in this position the carrier straps 182 will be slipped over a person's shoulders and the carrier and its load braced against the carriers back by means of hip pad 204 seen best in FIG. 10.

As seen in FIG. 16, an alternate hinge means is shown which includes the securement to the main frame member 150 by bracket means designated as 196 having a hinge element 198 extending therethrough. To secure outwardly extending frame element 156 in the appropriate position it will be alternatively pinned into position 200 or 202.

Thus, as can readily be seen, the present invention allows a person to transport a child over smooth terrain in relative safety and comfort by using the device as a stroller whereas when the terrain becomes uneven or when space becomes a premium, it may be immediately converted to a backpack-type carrier without reducing the comfort or safety of the child. When the device is not in use, it may be readily collapsed and stored within a small area. It is to be understood that although not specifically a part of the present invention, items such as swivel wheels, pouches for carrying other articles, brakes and the like may easily be included and are understood to be a part of the preferred embodiment.

We claim:

1. A stroller which may be partially collapsed and carried as a backpack or fully collapsed for storage comprising:

a rigid main frame member of rectangular configuration, a lower wheeled element hingedly secured to one end of the frame member, said wheeled element being independently has selectively movable from a collapsed position adjacent the main frame member to an extended position at an acute angle to the main frame member, an infinitely adjustable support member interconnecting the main frame member and the wheeled element, said support member locking the wheeled element in position, an upper child supporting frame element supporting a seat, said frame element being independently and selectively movable from a collapsed position adjacent the main frame member to an extended position at an acute angle to the main frame member on the opposite side of the main frame member from the wheeled element, an infinitely adjustable support member interconnecting the frame member and the child supporting frame element and, shoulder strap means secured to the frame member and the frame element whereby the wheeled element may be collapsed and the unit carried as a backpack while the frame element is in either the child supporting position or the collapsed position.

2. A stroller as in claim 1, wherein at least one set of wheels is pivotable about both an axis parallel to and about an axis perpendicular to the frame member to which they are mounted.

3. A stroller as in claim 1, wherein a handle member is telescopically received in the main frame member.

4. A stroller as in claim 1, wherein the wheeled element is locked into the extended position by a support member therefore slidingly engaged with the frame member.

5. A stroller as in claim 1, wherein the upper child supporting frame member is locked into the extended position by a support member slidingly engaged with the main frame member.

6. A stroller as in claim 1, wherein the seat is removable.

* * * * *